United States Patent [19]

Sampayo

[11] 4,382,359

[45] May 10, 1983

[54] GAS TURBINE ENGINE

[76] Inventor: Eduardo A. Sampayo, Ministro Brin 3674, Lanús Oeste, Provincia de Buenos Aires, Argentina

[21] Appl. No.: 229,015

[22] Filed: Jan. 27, 1981

[51] Int. Cl.³ .............................................. F02C 7/10
[52] U.S. Cl. .................................. 60/39.511; 60/728
[58] Field of Search .................. 60/39.51 R, 39.51 H, 60/728; 165/139

[56] References Cited

U.S. PATENT DOCUMENTS 2,513,601 7/1950 Traupel ................................ 60/728
2,709,893 6/1955 Birmann ......................... 60/39.51 R

FOREIGN PATENT DOCUMENTS 459368 9/1950 Italy .............................. 60/39.51 R Primary Examiner—Louis J. Casaregola
Attorney, Agent, or Firm—Scully, Scott, Murphy & Presser

[57] ABSTRACT

A gas turbine engine of simple construction having a compressed air cooler between the first and second stages of compression. A turbine with a heat recuperator is arranged to transfer heat from the exhaust gas stream to the combustion inlet. The air cooler and recuperator are of tubular type, formed by a plurality of small diameter tubes uniformly distributed forming coaxial cylindrical bodies placed one within the other. Heat exchange flanges are joined to each other and are situated in the same plane. The stator parts of the engine constitute a shell assembly having plural shells arranged one within the other with their free ends supported on the flanges of the heat exchangers, hermetically sealing the annular spaces and forming inlet and outlet areas of compressed air in the cooler and in the recuperator.

7 Claims, 4 Drawing Figures

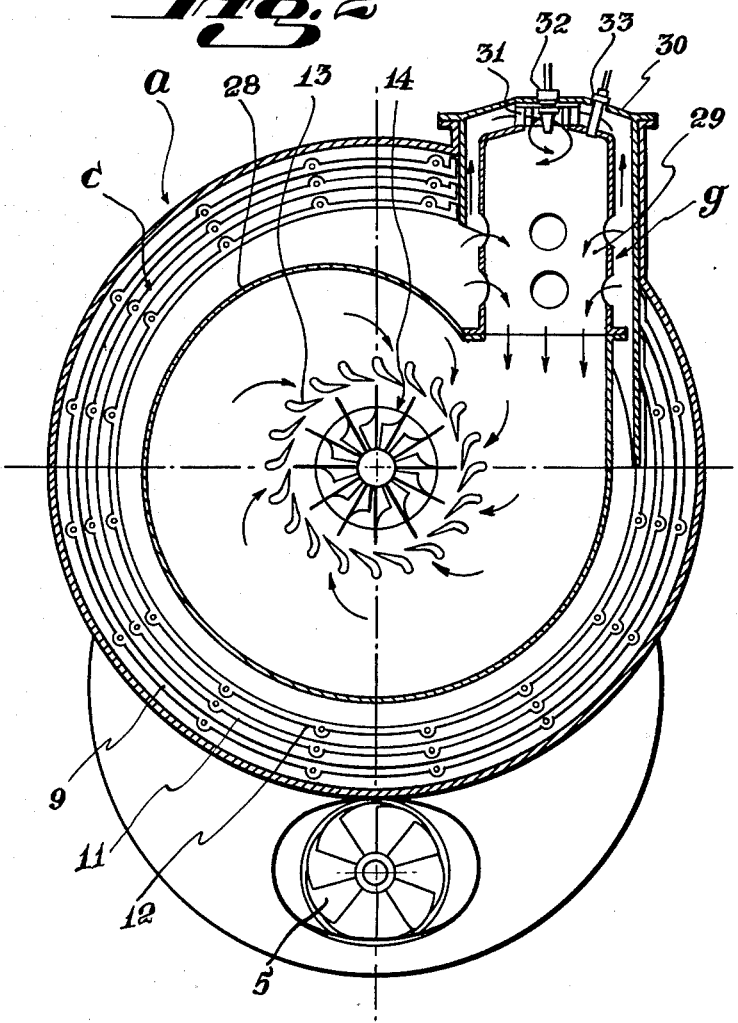

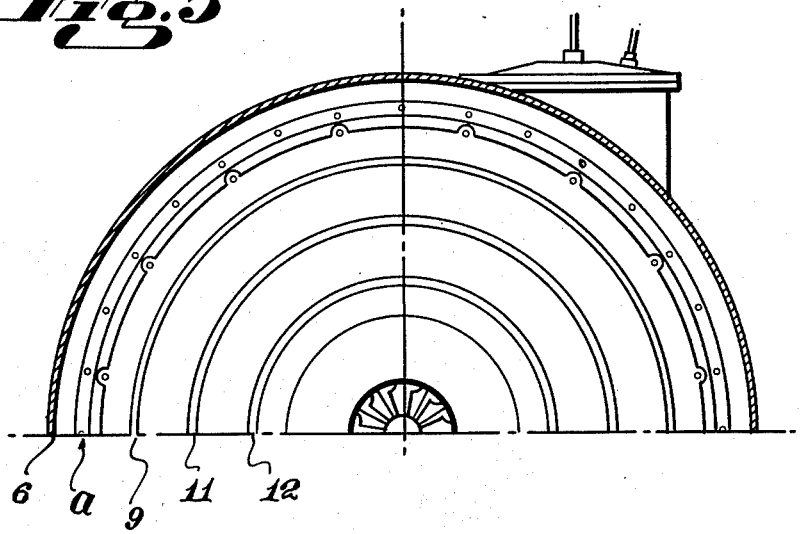
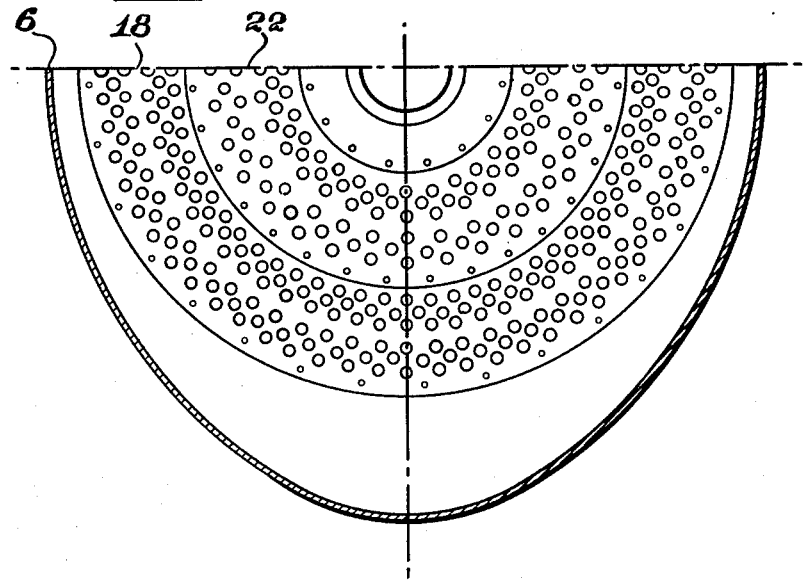

GAS TURBINE ENGINE

BACKGROUND OF THE INVENTION

The object of the present invention is the embodiment of a gas turbine engine of simple construction and high output, adaptable to multiple use.

As an example, it may be used as a power plant to generate electric power, or as an engine for vessels, trains, helicopters, buses, trucks, automotors, etc.

This embodiment, on being put into practice, will offer important advantages over the gas turbine engines existing at present, not only by its low manufacturing cost but also due to the high thermal output that may be expected from it.

The simple construction of this engine will make it particularly adequate for its manufacture with low power to be used in vehicles, in which it may advantageously compete with the present alternative Otto or Diesel cycle engines.

It is to be pointed out that each of the component parts of the engine were worked out on the basis of thorough theoretical calculations, thus insuring the technical feasibility of the invention.

SUMMARY OF THE INVENTION

In order to take full advantage of a high efficiency thermic cycle, a compressed air cooler was developed between the first and the second compression on stages, that use a current of cold air generated by a fan as refrigerant.

A heat recuperator or regenerator is arranged to recuperate the residual heat of the exhaust gases.

Both heat exchangers are of the tubular type, formed by a plurality of small diameter tubes uniformly distributed forming both coaxial cylindrical bodies, placed one within the other.

A large portion of the components of the engine is formed by bodies of coaxial revolutions between each other, a fact that greatly simplifies the mechanizing of the parts and the adjustment to each other.

The compressor is of the two-stage centrifugal type and the turbine is of the one-stage radial type. All the rotors are mounted on one sole axle, with the bearing located in a cold and easy to reach area.

BRIEF DESCRIPTION OF THE DRAWINGS

For a clearer and better understanding of the object of the present invention, same has been illustrated in several drawings, in which the new gas turbine engine is represented in one of the preferred embodiments of performance as an example, in which:

FIG. 2 is a cross section view of the combustion chamber area of the engine.

FIGS. 3 and 4 are partial views of the engine and the heat exchangers, respectively, according to their joining planes.

In the different drawings the same numbers and reference letters indicate equal or corresponding elements or parts.

DETAILED DESCRIPTION OF THE PREFERRED EMBODIMENTS

Figure 1:
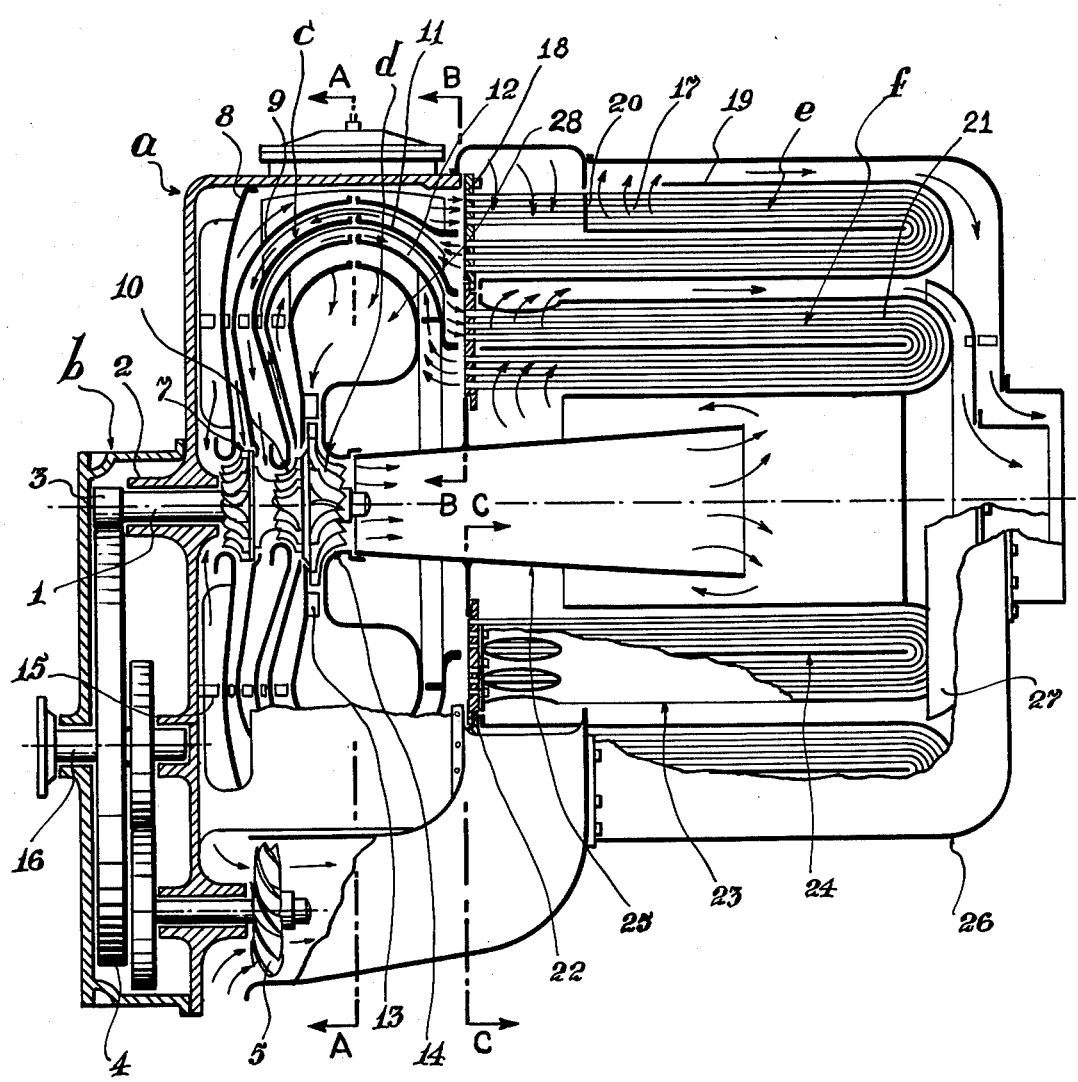
FIG. 1 is a middle cut section of the engine, that schematically illustrates the arrangement of its principal component parts.

In order that it may be easily understood, reference will be made to the essential elements that correspond to the operation of the engine.

As may be observed in FIG. 1, a is the body or principal structure of the engine, and is coupled to a reduction gear box b that houses the movement of the receiver shaft and to a fan 5. This last element produces a cold air flow conducted through an annular chamber 6 to the cooler.

There is an assembly of shalls c joined to each other and to body a by means of bolts 15, said shells establish the stator parts of the compressor and the turbine.

The rotor assembly d is constituted by rotors 7 and 10 of the compressor and rotor 14 of the turbine, mounted on the only shaft 1, supported on bearing 2, pinion 3 is fixed at the end of said shaft that transfers the movement to gear 4 and to the outlet shaft 16.

The flow of air and combustion gases is represented in the drawings by means of arrows.

The first compression stage consists of rotor 7 and shells 8 and 9 that form the diffuser of the stage that likewise guide the compressed air flow to the cooler.

The air returns to the compressor through the space delimited by shells 9 and 11.

The second compression stage consists of rotor 10 and shells 11 and 12 that form the diffuser of the stage that also guide the compressed air flow toward the heat recuperator.

The compressed and heated air enters the toroidal chamber formed by shell 12, in the inner portion of which the distribution chamber of combustion gases 28 is fitted.

Said shell 12 is formed by two portions joined by means of screws.

Chamber 28, held in position by means of shell 12, is formed by two portions: one portion supports nozzle 13 of the turbine and the other portion is the external outline of the gas flow through rotor 14.

Parts 9, 11 and 12 are supported on their free ends on flanges of the heat exchangers and hermetically close the different chambers for the flow of compressed air.

The air cooler e is formed by a set of small diameter tubes 17 welded on both ends to flange 18 that is coupled by screws to the body a.

There is a central partition that divides the set of tubes in two portions that allows the flow of refrigerating air to be countercurrent with regard to the compressed air.

Cover 19 is the external outline of the refrigerating air.

The heat exchanger or regenerator f is formed by a set of tubes 21 welded on both ends of flange 22, that is coupled with screws to flange 18 of the cooler.

Flange 22 also supports the outlet diffuser of turbine 25.

The central partition 24 divides the set of tubes into two portions that allows the exhaust gases flow in countercurrent with regard to the compressed air.

Cover 23 forms the external outline for the gas flow and has a row of holes in the area near the flange for the gas outlet.

The external cover 26 joined to the annular chamber 6, leads the flow of refrigerating air outwardly.

A shell 27 is joined to cover 26 that leas the flow of exhaust gas outwardly.

Due to the favorable stratification of temperatures obtained with this design, the use of insulating material is not necessary in any of the parts of the engine. Many of its component parts may be manufactured with lightweight alloys, that will reduce the total weight and their manufacturing cost.

For example, the following parts a, b, 5, 6, 8, 17, 18, 20 and 26 may be manufactured with aluminum alloys.

FIG. 2 shows a section of the combustion chamber g and the chamber for the distribution of combustion gases 28.

In the centre of said drawing nozzles 13 and rotor 14 of the turbine may be observed.

The assembly of shells 9, 11 and 12, concentric with body a, are formed by two parts and appear in the drawing according to the joint plane between both parts.

There is a flame tube 29 held in position by part 30, fixed by means of screws to body a.

The primary air enters the flame tube through the vortex generator 31 and is mixed with the fuel supplied by injector 32; a spark plug produces the initial ignition of the combustion.

The combustion chamber crosses through the whole shell assembly c, therefore each shell must have coaxial openings between each other, adjusted over the external cylinder of the combustion chamber to ensure the airtight closing of each chamber.

FIG. 3 shows an assembly of concentric rings that strating from outside inward, are the following: the annular chamber for the distribution of the refrigerating air 6, the body of the engine a, and shells 9, 11 and 12 seen according to the bearing rings with the flanges of the heat exchangers.

FIG. 4 shows the bottom portion of chamber 6, flange 18 of the air cooler and flange 22 of the regenerator. The small circles represent the ends of the heat exchanger tubes fixed to the flange.

It is doubtless that in putting the present invention into practice, some modifications may be introduced as to the construction and form of the engine described above, without departing from the basic principles clearly specified in the claims detailed below:

Having described and determined the nature of the present invention and the manner in which it will be put into practice, I hereby claim as my exclusive right and property:

1. A gas turbine engine, comprising a compressor with a compressed air cooler between stages and a turbine with a heat recuperator for exhaust gases, characterized by the fact that the air cooler is formed by a set of parallel tubes joined at both ends to a first flange and uniformly distributed so as to form a hollow body in the inner part of which the heat recuperator is housed, said heat recuperator being formed by a set of parallel tubes joined at both ends to a second flange, both flanges being joined to each other and to the body of the engine, the compressor and the turbine comprising a shell assembly having plural shells arranged one within the other and fixed to the body of the engine, said shells forming the diffusers of the compression stages with their free ends supported on the flanges of the heat exchangers and hermetically closing the different compressed air chambers therein, each annular space so described coinciding with the corresponding inlet and outlet areas of compressed air in the cooler and in the heat recuperator, and housed within said shell assembly are: a distribution chamber for combustion gases connected to a flame tube, turbine nozzles, and a rotor assembly formed by the rotors of the compressor and of the turbine assembled on a single shaft and coupled to an output shaft by means of a reduction gear box joined to the body of the engine.

2. A gas turbine engine, as claimed in claim 1, characterized by the fact that the distribution chamber for the combustion gases is formed by two parts, one of said parts supporting the nozzles of the turbine and the other part forming the external boundary of the gases in the rotor area.

3. A gas turbine engine, as claimed in claim 1, characterized by the fact that the last of the internal shells of the engine is divided into two portions joined to each other, said last shell holding in its inner part the distribution chamber for the combustion gases.

4. A gas turbine engine, as claimed in claim 1, characterized by the fact that the turbine heat recuperator has a cover on the external portion of the set of tubes fixed to the second flange, and one or more inernal partitions that delimit the exhaust gas flow.

5. A gas turbine engine, as claimed in claim 1, characterized by the fact that the air cooler has a cover on the external portion of the set of tubes joined to the first flange, and one or more internal partitions that delimit the cooling air flow.

6. A gas turbine engine, as claimed in claim 1, characterized by the fact that the air cooler has an annular chamber to distribute cooling air.

7. A gas turbine engine, as claimed in claims 1 or 6, characterized by the fact that it has a cover on the external part of the heat exchangers that leads the cooling air and the exhaust gas flow outside the engine.

* * * * *